United States Patent [19]

Graupp et al.

[11] Patent Number: 4,646,243
[45] Date of Patent: Feb. 24, 1987

[54] APPARATUS FOR DETERMINING THE GROUNDSPEED RATE OF AN AIRCRAFT

[75] Inventors: Frederick G. Graupp, Bellevue; Francis J. van Leynseele, Edmonds, both of Wash.

[73] Assignee: The Boeing Company, Seattle, Wash.

[21] Appl. No.: 457,813

[22] Filed: Jan. 13, 1983

[51] Int. Cl.[4] .................. G05D 1/08; G06F 15/50; G01C 21/10; G01C 21/00
[52] U.S. Cl. .................. 364/439; 364/566; 364/565; 364/440; 244/182; 73/488; 340/978
[58] Field of Search ............ 364/566, 565, 440, 439, 364/433; 244/182; 73/488, 509, 510, 511; 340/967, 969, 973, 974, 975, 978

[56] References Cited

U.S. PATENT DOCUMENTS

| | | | |
|---|---|---|---|
| 2,873,074 | 2/1959 | Harris, Jr. et al. | 244/191 |
| 3,080,546 | 3/1963 | Deschamps et al. | 340/669 |
| 3,327,972 | 6/1967 | Greene | 340/968 |
| 3,594,553 | 7/1971 | McElroy | 244/182 |
| 3,654,443 | 4/1972 | Dendy et al. | 73/178 R |
| 3,724,786 | 4/1973 | Adams et al. | 244/182 |
| 3,748,900 | 7/1973 | Lindquist | 244/182 |
| 3,948,096 | 4/1976 | Miller | 244/191 |
| 3,987,988 | 10/1976 | Powell et al. | 244/182 |
| 4,021,010 | 5/1977 | Bliss | 340/968 |
| 4,079,905 | 3/1978 | Greene | 73/178 R |
| 4,093,158 | 6/1978 | Clews et al. | 340/974 |
| 4,095,271 | 6/1978 | Muller | 340/975 |
| 4,106,093 | 8/1978 | Grimm et al. | 244/182 |
| 4,106,731 | 8/1978 | Bliss | 244/182 |
| 4,133,503 | 1/1979 | Bliss | 244/182 |
| 4,280,188 | 7/1981 | Weinstein et al. | 364/566 |
| 4,357,663 | 11/1982 | Robbins et al. | 364/433 |

FOREIGN PATENT DOCUMENTS 1077984  5/1960  Fed. Rep. of Germany ...... 244/182

Primary Examiner—John W. Caldwell, Sr.
Assistant Examiner—Donna Angotti
Attorney, Agent, or Firm—M. C. Cesarano; B. A. Donahue

[57] ABSTRACT

Aircraft gyro (20, 22) signals $\theta$ and $\phi$, representative of pitch and roll attitude, respectively, and accelerometer (24, 26, 28) signals $a_x$, $a_y$, $a_z$, representative of longitudinal, lateral, and normal acceleration, respectively, are processed (30, 32, 34, 36, 38, 40) to produce signals $a_{GSLO}$, $a_{GSLA}$, and $a_{GSN}$, representative of the longitudinal, lateral, and normal groundspeed rate components, respectively. The component signals are summed (50) to produce a signal representative of total aircraft groundspeed rate.

2 Claims, 2 Drawing Figures

APPARATUS FOR DETERMINING THE GROUNDSPEED RATE OF AN AIRCRAFT

BACKGROUND OF THE INVENTION

The present invention pertains to the aircraft monitoring and control art and, more particularly, to apparatus for determining the groundspeed rate of an aircraft.

A particular application of an aircraft system requiring groundspeed information is in a wind shear compensation system. Such a system is described in co-pending patent application Ser. No. 453,433, filed on Dec. 27, 1982, and having the same assignee as the present application. In such systems, windspeed is determined by measuring changes in the aircraft's relative groundspeed. Heretofore, expensive and complex systems have been employed to measure groundspeed changes accurately for use in wind shear compensation systems. Such prior art systems include inertial navigation systems, inertial reference systems, and others.

Prior attempts have been made at predicting groundspeed using inexpensive accelerometers and vertical gyros. These attempts have failed because instrument errors contaminate the resultant groundspeed output signals.

Inasmuch as the cost of installing highly sophisticated avionic systems in existing aircraft is prohibitive, and inasmuch as prior art attempts to monitor groundspeed by use of less expensive sensors have failed, there is a long felt need in this art for a groundspeed determining system which is accurate in operation but inexpensive to install and maintain.

SUMMARY OF THE INVENTION

It is an object of this invention, therefore, to provide a means which uses conventional aircraft sensors to produce a groundspeed-related signal suitable for use in aircraft systems such as a wind shear compensation system.

Briefly, according to the invention, apparatus for determining the groundspeed rate of an aircraft includes a means adapted to receive a signal $\theta$ representative of aircraft pitch attitude. The apparatus also includes means adapted to receive a signal $\phi$ representative of aircraft roll attitude, and signals $a_x$, $a_y$, $a_z$ representative of aircraft longitudinal, lateral, and normal acceleration, respectively. Processing means predeterminedly processes the $\theta$, $\phi$, $a_x$, $a_y$, and $a_z$ signals to produce groundspeed reference rate signals in the longitudinal, lateral, and normal directions. These signals are summed to produce a signal representative of aircraft total groundspeed rate.

DETAILED DESCRIPTION OF THE PREFERRED EMBODIMENT OF THE INVENTION

Figure 1:
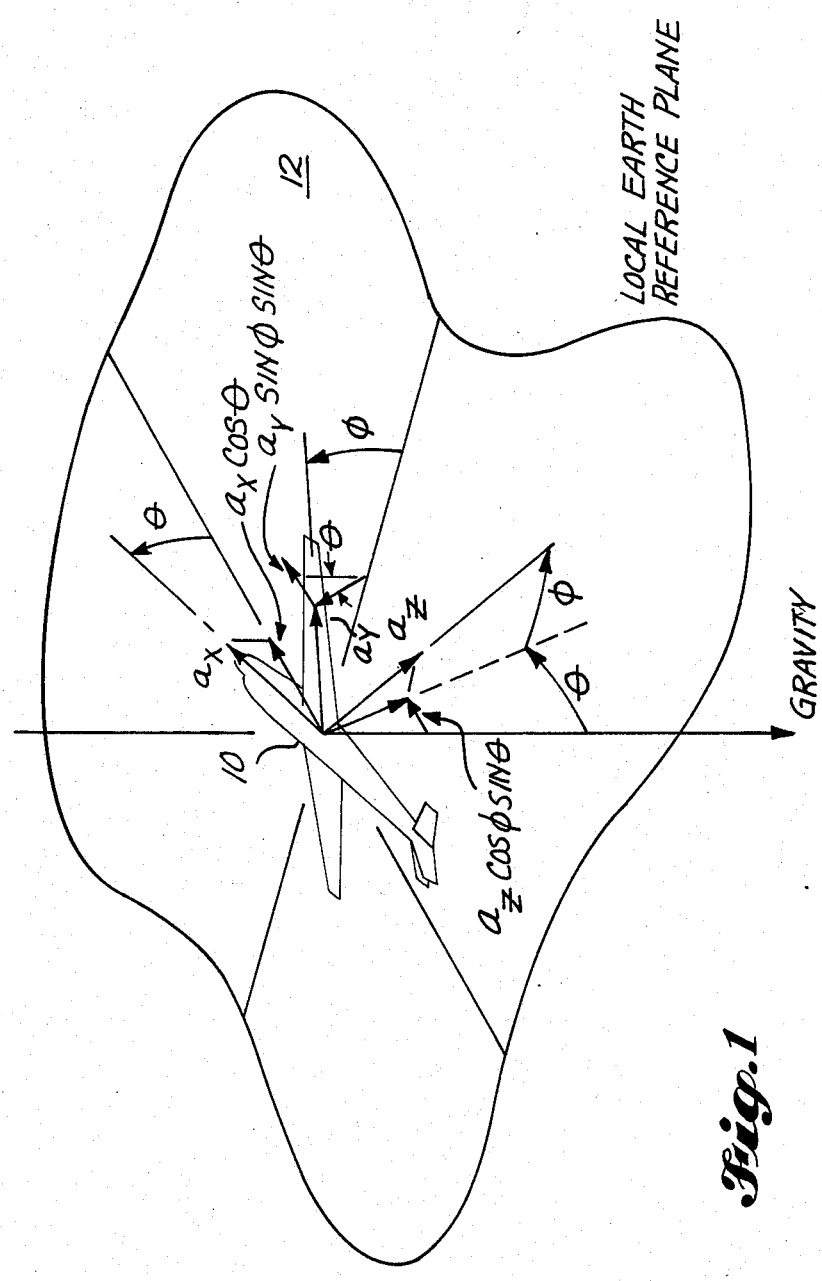
FIG. 1 is a perspective view of an aircraft in flight showing its angular relationship to an earth reference plane.

FIG. 1 is a perspective view of an aircraft 10 in flight. The aircraft has a longitudinal acceleration $a_x$, a lateral acceleration $a_y$ and a normal acceleration $a_z$. The pitch angle of the aircraft is shown as $\theta$, with a roll angle of $\phi$.

The aircraft is shown relative to a local earth reference plane, indicated generally at 12. By trigonometry, the longitudinal component of aircraft acceleration in the earth plane is given as $$a_{GSLO} = a_x \cos\theta.$$

The lateral component of aircraft acceleration in the earth plane is given as $$a_{GSLA} = a_y \sin\phi \sin\theta.$$

The normal component of aircraft acceleration in the earth plane is given as $$a_{GSN} = a_z \cos\phi \sin\theta.$$

Thus, the sum of these longitudinal, lateral and normal earth plane reference components represents the aircraft's total ground-referenced acceleration, or, groundspeed rate.

Figure 2:
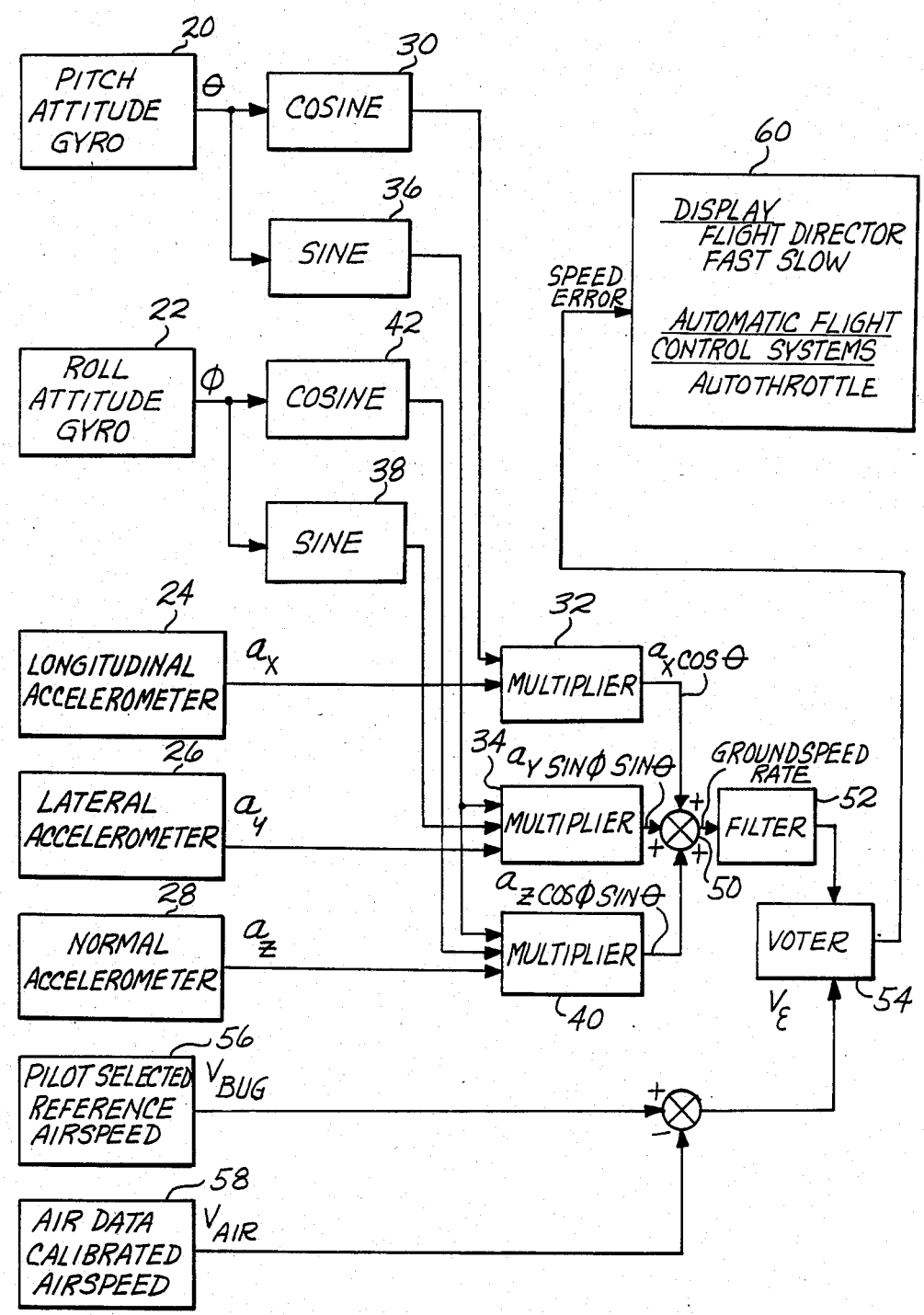
FIG. 2 is a block diagram illustrating the preferred embodiment of the groundspeed rate determining apparatus.

FIG. 2 is a block diagram illustrating the preferred embodiment of the groundspeed rate determining system in combination with a flight control system.

Here, the aircraft's pitch attitude and roll attitude are sensed by conventional sensors 20, 22 which produce representative output signals $\theta$, $\phi$, respectively. In addition, signals $a_x$, $a_y$, $a_z$ are produced by conventional accelerometers 24, 26, and 28. The accelerometers 24, 26, and 28 are oriented in the aircraft's longitudinal, lateral, and normal axes, respectively.

The cosine of $\theta$ is taken at block 30, with the output being passed as one input to a multiplier 32. The remaining input to multiplier 32 is a longitudinal accelerometer produced signal $a_x$. Thus, the output from multiplier 32 is a signal of the form $a_x \cos\theta$, corresponding to the longitudinal component of groundspeed rate, $a_{GSLO}$.

Input to a multiplier 34 is the sine of $\theta$, produced by block 36, the sine of $\phi$, produced by block 38, and the output from lateral accelerometer 26. Hence, the signal produced at the output of multiplier 34 is of the form $a_y \sin\phi \sin\theta$, seen to be the lateral component of groundspeed rate, $a_{GSLA}$.

A multiplier 40 has as its inputs the sine of $\theta$ out of block 36, the cosine of $\phi$ out of block 42, and the signal $a_z$ produced by the normal accelerometer 28. The output from multiplier 40 is, thus, a signal $a_{GSN}$, representative of the normal component of groundspeed rate $a_z \cos\phi \sin\theta$.

The three components of groundspeed rate are summed in a summer 50. The output from summer 50 is, thus, a signal $a_{GS}$ representative of aircraft groundspeed rate.

It should be noted that the groundspeed rate was determined by simple processing of conventional and inexpensive aircraft sensor provided signals.

A filter 52, using known filtering and signal conditioning techniques, smooths the accelerometer signals by eliminating high frequency noise signals. The summed and filtered three-axis acceleration components form a single signal which represents acceleration of the aircraft projected on the ground plane. This signal is then passed an error signal $V_\epsilon$ representing the difference between a pilot-selected reference airspeed $V_{BUG}$ at 56 and the aircraft's actual airspeed $V_{AIR}$ produced by a conventional airspeed detecting system 58. Thus, the voter has at its inputs signals representing the filtered groundspeed rate and the difference between the pilot-selected reference airspeed and the aircraft's actual airspeed. The voter 54 acts to select as its output signal the groundspeed rate signal if this signal is positive (greater than 0) AND it is greater in magnitude than the airspeed error signal. In this way, the voter 54 selects as its output the groundspeed rate if the rate of groundspeed loss is greater than airspeed error, the airspeed error signal being otherwise selected. This assures that the output from the voter is a signal representing maximum speed error or, in other words, a required aircraft thrust to maintain a desired airspeed and a desired groundspeed.

This signal is fed to the aircraft's display and automatic flight control systems, indicated generally at 60. As a display, the signal is indicative, when used with a flight director, to indicate a required thrust change. In addition, the signal may be fed directly to the aircraft's automatic flight control system to directly control the autothrottle, thereby producing the required thrust change.

In summary, apparatus for determining the groundspeed rate of an aircraft has been described in detail. The apparatus employs simple processing of conventional, inexpensive aircraft sensor output signals to determine groundspeed rate. This groundspeed rate signal may be used, for example, in an aircraft flight control system to display and control aircraft thrust.

While a detailed embodiment of the invention has been described, many modifications and variations thereto are possible, all of which fall within the true spirit and scope of the invention.

We claim:

1. Apparatus for determining the groundspeed rate and a maximum speed error of an aircraft comprising:
    means adapted to receive a signal $\theta$ representative of aircraft pitch attitude;
    means adapted to receive a signal $\phi$ representative of aircraft roll attitude;
    means adapted to receive signals $a_z$, $a_y$, $a_z$ representative of aircraft longitudinal, lateral, and normal acceleration, respectively;
    means for producing a signal $a_{GSLO}$ representative of the groundspeed rate of said aircraft due to the longitudinal acceleration of said aircraft, where:

$$a_{GSLO} = a_x \cos\theta;$$

means for producing a signal $a_{GSLA}$ representative of the groundspeed rate of said aircraft due to the lateral acceleration of said aircraft, where:

$$a_{GSLA} = a_y \sin\phi \sin\theta;$$

means for producing a signal $a_{GSN}$ representative of the groundspeed rate of said aircraft due to the normal acceleration of said aircraft, where:

$$a_{GSN} = a_z \cos\phi \sin\theta;$$

means for summing said $a_{GSLO}$, $a_{GSLA}$ and $a_{GSN}$ signals to produce a signal $a_{GS}$ representative of the total groundspeed rate of said aircraft;
    filter means for noise filtering said $a_{GS}$ signal;
    means for producing a signal $V_\epsilon$ representing the difference between a selected airspeed and said aircraft's actual airspeed; and
    voter means receiving said filtered $a_{GS}$ signal and said $V_\epsilon$ signal for outputting a maximum speed error of said $a_{GS}$ signal if said $a_{GS}$ signal is greater than zero and if said $a_{GS}$ signal is greater in magnitude than said $V_\epsilon$ signal, the voter means otherwise outputting a maximum speed error of said $V_\epsilon$ signal.

2. A system for determining the groundspeed rate and a maximum speed error of an aircraft comprising:
    means for producing a signal $\theta$ representative of aircraft pitch attitude;
    means for producing a signal $\phi$ representative of aircraft roll attitude;
    longitudinal accelerometer means for producing a signal $a_x$ representative of aircraft longitudinal acceleration;
    lateral accelerometer means for producing a signal $a_y$ representative of aircraft lateral acceleration;
    normal accelerometer means for producing a signal $a_z$ representative of aircraft normal acceleration;
    means for producing a signal $a_{GSLO}$ representative of the longitudinal component of aircraft groundspeed rate where:

$$a_{GSLO} = a_x \cos\theta;$$

means for producing a signal $a_{GSLA}$ representative of the lateral component of aircraft groundspeed rate where:

$$a_{GSLA} = a_y \sin\phi \sin\theta;$$

means for producing a signal $a_{GSN}$ representative of the normal component of aircraft groundspeed rate where:

$$a_{GSN} = a_z \cos\phi \sin\theta;$$

means for summing said $a_{GSLO}$, $a_{GSLA}$ and $a_{GSN}$ signals to produce a signal $a_{GS}$ represenatative of the total aircraft groundspeed rate of said aircraft;
    filter means for noise filtering said $a_{GS}$ signal;
    means for producing a signal $V_\epsilon$ representing the difference between a selected airspeed and said aircraft's actual airspeed; and
    voter means receiving said filtered $a_{GS}$ signal and said $V_\epsilon$ signal, for outputting a maximum speed error of said $a_{GS}$ signal if said $a_{GS}$ signal is greater than zero and if said $a_{GS}$ signal is greater in magnitude than said $V_\epsilon$ signal, the voter means otherwise outputting a maximum speed error of said $V_\epsilon$ signal.

* * * * *